United States Patent [19]

Hayakawa et al.

[11] Patent Number: 4,713,989
[45] Date of Patent: Dec. 22, 1987

[54] SHIFT SHOCK SUPPRESSION IN AUTOMATIC TRANSMISSION

[75] Inventors: Yoichi Hayakawa, Toyoake; Masao Kawai, Chiryu; Seiichi Nishikawa, Toyokawa; Kagenori Fukumura, Toyota, all of Japan

[73] Assignee: Aisin Warner Limited, Japan

[21] Appl. No.: 779,252

[22] Filed: Sep. 23, 1985

[30] Foreign Application Priority Data

Sep. 28, 1984 [JP] Japan ............... 59-204545

[51] Int. Cl.⁴ ............................................. B60K 41/04
[52] U.S. Cl. ........................................ 74/869; 74/867; 74/752 C
[58] Field of Search .............. 74/869, 868, 853, 856, 74/861, 867, 740, 752 C, 752 A; 180/244, 247

[56] References Cited

U.S. PATENT DOCUMENTS

| | | | |
|---|---|---|---|
| 3,707,890 | 1/1973 | Ito | 74/868 |
| 3,710,630 | 1/1973 | Sumiyoshi et al. | 74/867 |
| 3,988,951 | 11/1976 | Mair et al. | 74/869 |
| 4,036,083 | 7/1977 | McQuinn | 74/867 |
| 4,056,991 | 11/1977 | Sukai et al. | 74/867 |
| 4,125,038 | 11/1978 | Hiramatsu | 74/869 |
| 4,161,895 | 7/1979 | Ushijima et al. | 74/869 |
| 4,188,839 | 2/1980 | Kubo et al. | 74/869 |
| 4,334,441 | 6/1982 | Iwanaga et al. | 74/869 |
| 4,369,671 | 1/1983 | Matsumoto | 74/869 |
| 4,476,747 | 10/1984 | Kawamoto | 74/868 |

Primary Examiner—Leslie Braun
Assistant Examiner—David Novais
Attorney, Agent, or Firm—Steele, Gould & Fried

[57] ABSTRACT

A hydraulic control system for an automatic transmission, including a pressure source, a regulator valve for regulating the oil pressure from the source, a first hydraulic servo for setting the transmission in a high speed position upon receipt of output oil pressure of the pressure regulator valve, and a second hydraulic servo for setting the transmission in a low speed position upon receipt of the output oil pressure, wherein the hydraulic control system comprises:

a shift timing mechanism including a shift timing valve provided in a drain conduit of the second hydraulic servo and adapted to accelerate drainage of the second hydraulic servo in response to increases in supply oil pressure to the first hydraulic servo.

5 Claims, 11 Drawing Figures

SHIFT SHOCK SUPPRESSION IN AUTOMATIC TRANSMISSION

BACKGROUND OF THE INVENTION (i) Field of the Invention

This invention relates generally to a hydraulic control system for automatic transmissions, and in particular, to a control system which suppresses shift shocks.

(ii) Description of the Prior Art

The speed change gear system which shifts an automatic transmission to and from a high speed range and a low speed range generally comprises planetary gear sets and friction coupling devices which releasably couple the component parts of the planetary gear sets with stationary or rotational members in the automatic transmission case. The transmission is shifted by selectively coupling the component parts of the planetary gear set with the stationary or rotational members.

Figure 10:
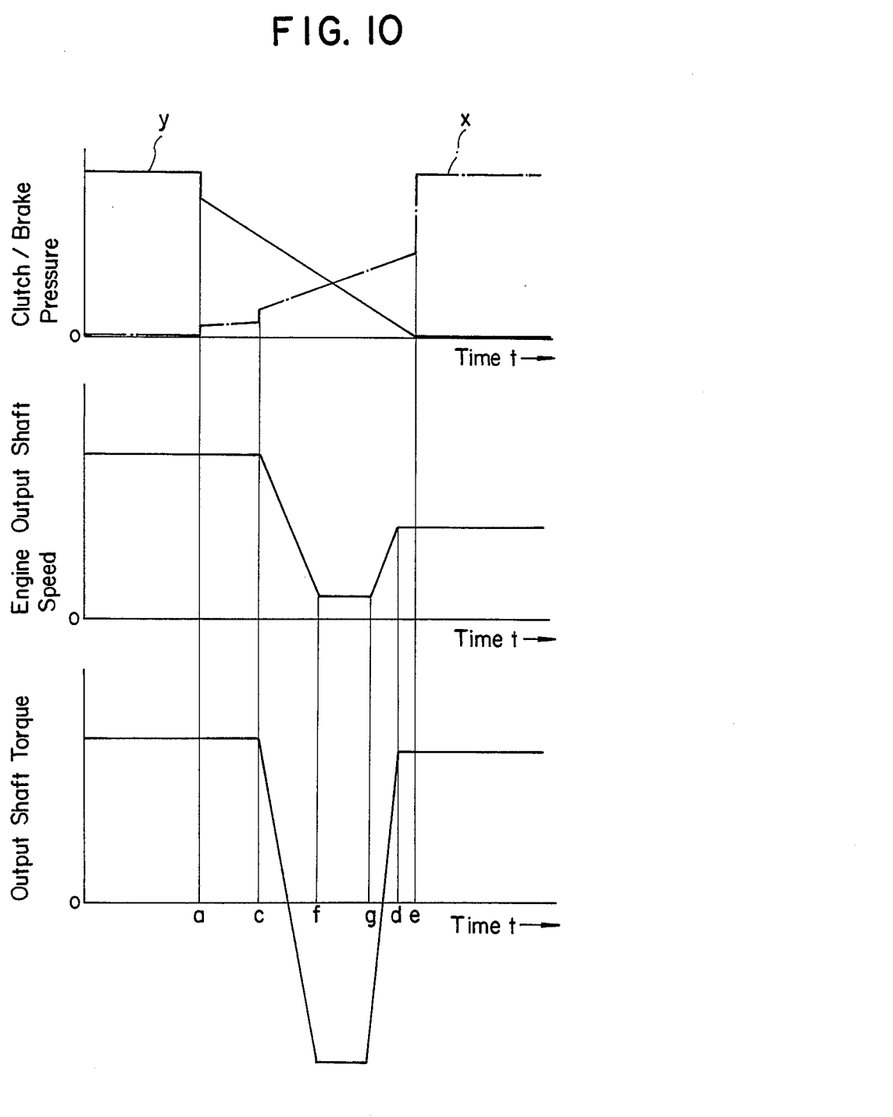
FIGS. 10 and 11 are diagrams showing conventional characteristics of servo pressure, engine output shaft speed and output shaft torque at the time of L-H shift.
Figure 11:
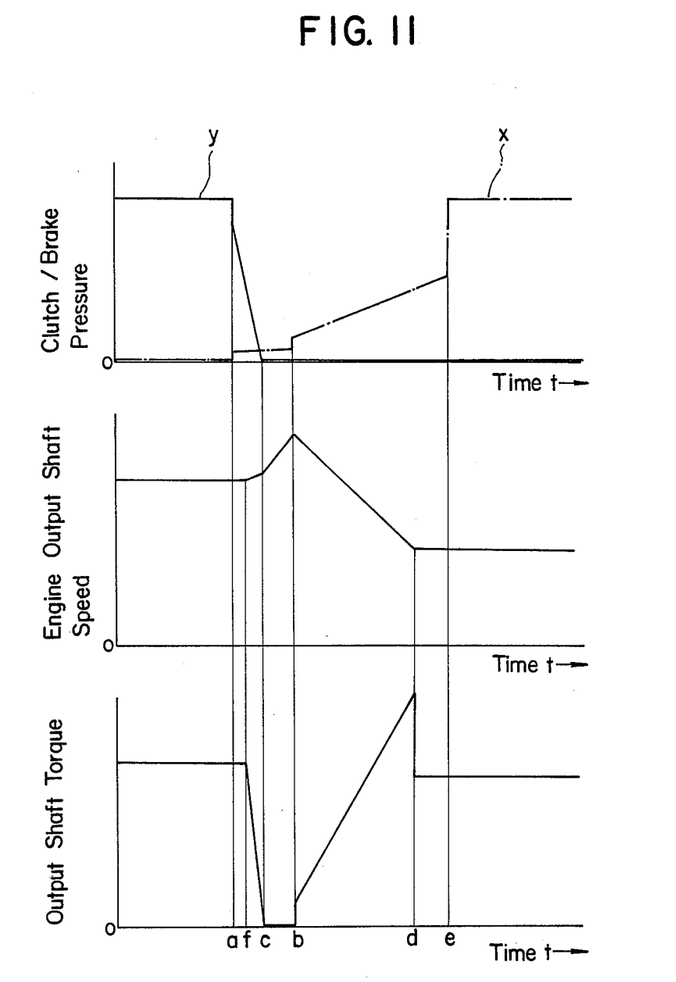

In a case where an automatic transmission with the above-described speed change gear system is not provided with a one-way clutch or other means for mechanically controlling the shifts between the high and low speed ranges, it has been the conventional practice to provide an orifice in the drain conduit of a hydraulic servo which establishes the low speed range, varying the diameter of the orifice to adjust the drain speed of the oil from the hydraulic servo for adjusting the timing of engagement and release of friction elements at the time of shifts. However, it has been difficult to control the timing appropriately. In this connection, FIG. 10 is a diagram of a case where the drain orifice in the drain conduit for the low speed range has a small diameter at the time of a shift from a low to high speed range, while FIG. 11 shows a case where the drain orifice has a large diameter. (x=the oil pressure of the hydraulic servo for the high speed range, and y=the oil pressure of the hydraulic servo for the low speed range.) In FIG. 10, the friction elements of both the high and low speed ranges are engaged during the time period from Tc to Td, so that the output shaft is held stationary, abruptly braking the vehicle and therefore impairing the shift feeling. In the case of FIG. 11, the friction elements of both the high and low speed ranges are disengaged during the time period of from Tc to Tb, increasing the rotational speed of the engine. Accordingly, there may occur overrunning of the engine in a high speed operation with a large throttle opening. Further, the increase of the engine speed during the time period from Tc to Tb invites accumulation of an increased amount of rotational energy in rotating parts (e.g., engine, drive plate, transmission etc.), so that a larger amount of energy is discharged upon engagement of the friction element of the high speed range, giving a greater shock at the time of a shift.

SUMMARY OF THE INVENTION

It is an object of the present invention to provide a hydraulic control system which is capable of controlling the timing of shifts between high and low speed ranges, in an automatic transmission of the type without a clutch or other mechanical shift timing means.

In order to achieve the above-mentioned objective, the present invention provides a hydraulic control system for an automatic transmission, including a pressure source, a pressure regulator valve for regulating the oil pressure from the pressure source, and a hydraulic servo for setting the speed change gear of the transmission in a high speed range and a hydraulic servo for setting the speed change gear of the transmission in a low speed range when supplied with the output oil pressure of the pressure regulator valve, characterized in that the hydraulic control system comprises: a shift timing mechanism including a shift timing valve provided in a drain conduit of the hydraulic servo of the low speed range and adapted to accelerate drainage of the oil pressure from the hydraulic servo of the low speed range in response to the increase of oil pressure being supplied to the hydraulic servo of the high speed range.

An automatic transmission with a hydraulic control system with the above-described shift timing mechanism according to the invention has a number of advantages as follows.

Since a shift timing mechanism including a shift timing valve is provided in a hydraulic control system of an automatic transmission without a one-way clutch or other mechanical shift timing means in its speed-change mechanism, it becomes possible to correlate the timing of oil pressure drainage from the hydraulic servo of the low speed range with the timing of oil pressure supply to the hydraulic servo of the high speed range to control the timing of shifts between the high and low speed ranges in such a manner as to suppress shift shocks.

The above and other objects, features and advantages of the invention will become apparent from the following description and the appended claims, taken in conjunction with the accompanying drawings which show by way of example some preferred embodiment of the invention.

DESCRIPTION OF PREFERRED EMBODIMENTS

Now the hydraulic control system of the invention is described more particularly by way of the preferred embodiments shown in the drawings.

Figure 1:
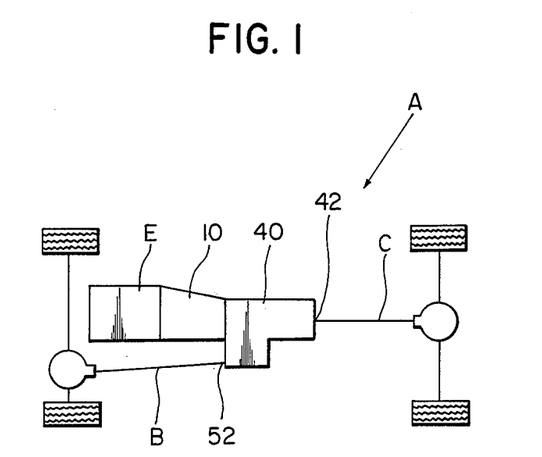
FIG. 1 is an outline of a 4-wheel drive motor vehicle.
Figure 2:
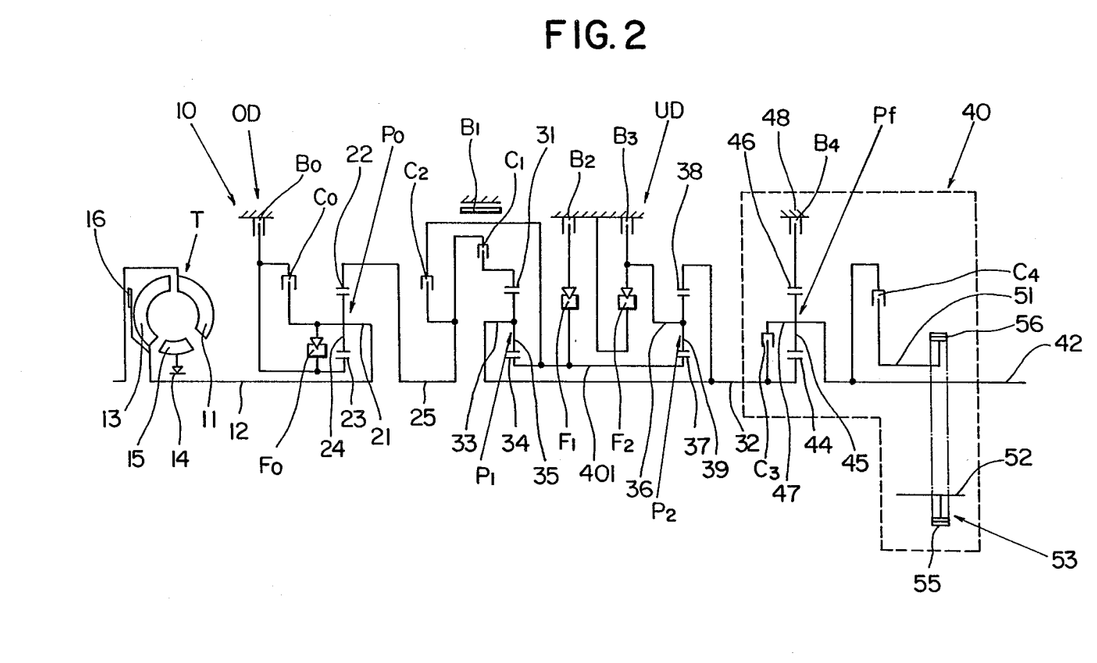
FIG. 2 is a skeletal view of 4-speed automatic transmission of the vehicle.

Referring to FIGS. 1 and 2, indicated at 10 is a main transmission or a 4-speed automatic transmission with an overdrive, and at 40 an auxiliary transmission or a 4-wheel drive transfer which is coupled with the output shaft 32 of a planetary gear set of the 4-speed automatic transmission 10. The 4-wheel drive transfer 40 is connected to the 4-speed automatic transmission 10 which is in turn connected to an engine E, with a first output shaft 41 coupled with a rear drive propeller shaft C and a second output shaft 52 coupled with a front drive propeller shaft B.

The 4-speed automatic transmission 10 includes a fluid type torque converter T, an overdrive mechanism OD and an underdrive mechanism UD with three forward and one reverse speed ranges.

The torque converter T includes: a pump 11 coupled with the output shaft of the engine; a turbine 13 coupled with the output shaft of the torque converter T; a stator 15 coupled with a stationary part through a one-way clutch 14; and a lock-up clutch 16. The output shaft 12 of the torque converter T also constitutes an input shaft of the overdrive mechanism OD.

The overdrive mechanism OD comprises friction coupling devices including a multiple disk clutch CO, a multiple disk brake BO and a one-way clutch FO, and a planetary gear set PO the component parts of which are either releasably fixed to a stationary part such as the transmission case or releasably coupled with the input shaft, output shaft or other component parts by selective engagement of the friction coupling devices.

The planetary gear set PO includes: a carrier 21 coupled with the input shaft 12; a ring gear 22 coupled with the output shaft 25 of the overdrive mechanism OD; a sun gear 23 rotatably fitted on the input shaft 12 and fixable to the transmission case through the brake BO, and coupled with the carrier 21 through the clutch CO and the one-way clutch FO which is mounted in parallel relation with the clutch CO; and planetary pinions 24 rotatably supported in the carrier 21 and meshed with the sun gear 23 and ring gear 22.

The output shaft 25 of the overdrive mechanism OD also serves as an input shaft of the underdrive mechanism UD with three forward and one reverse speed ranges.

The underdrive mechanism UD comprises friction elements including a multiple disk clutch C1, a belt brake B1, multiple disk brakes B2 and B3 and one-way clutches F1 and F2, and a front planetary gear set P1, and a reverse planetary gear set P2.

The planetary gear set P1 includes: a ring gear 31 coupled with the input shaft 25 through the clutch C1; a carrier 33 coupled with the output shaft 32 of the underdrive mechanism UD; a sun gear 34 coupled with the input shaft 25 through the clutch C2 and fixable to the transmission case through the belt brake B1, the brake B2 which is mounted parallel with the brake B1 and the one-way clutch F1 which is mounted in series with the brake B2; and planetary pinions 35 rotatably supported in the carrier 33 and meshed with the sun gear 34 and ring gear 31.

The rear planetary gear set P2 includes: a carrier 36 fixable to the transmission case through the brake B3 and the one-way clutch F2 which is mounted parallel with the brake B3; a sun gear 37 formed integrally with a sun gear shaft 401 together with the sun gear 37 of the front planetary gear set P1; a ring gear 38 coupled with the output shaft 32; planetary pinions 39 rotatably supported in the carrier 36 and meshed with the sun gear 37 and ring gear 38.

The shiftlever (not shown) of the main transmission, which is provided at the driver's seat for driving a manual valve 210 of the main hydraulic control system as described hereinafter, has main shift positions MSP for the ranges of P (parking), R (reverse), N (neutral), D (drive), S (second), and L (low). Table 1 below shows the ranges selected by the main shift positions MSP and the shift positions of the fourth speed (4), third speed (3), second speed (2) and first speed (1) in relation with the states of the respective clutches and brakes.

In Table 1, a circle "O" indicates the energized state of S1, S2 or S3, and a cross "x" indicates the de-energized state of S1, S2 or S3. A double circle " ⊚ " indicates a lock-up state by energization of S3. The characters "E" and "x" indicate that the corresponding clutch or brake is in an engaged or disengaged state, respectively. The letter "L" indicates a locked state in which the corresponding one-way clutch is engaged in engine-drive operation but its engagement is not necessarily required since the power is transmitted by a clutch or brake mounted in parallel thereto. The bracketed letter "(L)" indicates that corresponding one-way clutch is engaged only in engine-drive operation and not in engine-brake operation. The small letter "f" indicates that the corresponding one-way clutch is in free state.

TABLE 1

| MSP | | S1 | S2 | S3 | C1 | C2 | C0 | B1 | B2 | B3 | B0 | F1 | F2 | F0 |
|---|---|---|---|---|---|---|---|---|---|---|---|---|---|---|
| P | | O | x | x | x | x | E | x | x | x | x | f | f | f |
| R | | O | x | x | x | E | E | x | x | E | x | f | f | f |
| N | | O | x | x | x | x | E | x | x | x | x | f | f | f |
| D | 1 | O | x | x | E | x | E | x | x | x | x | f | L | (L) |
| | 2 | O | O | O | E | x | E | x | E | x | x | L | f | (L) |
| | 3 | x | O | O | E | E | E | x | E | x | x | f | f | (L) |
| | 4 | x | x | O | E | E | x | x | E | x | E | f | f | f |
| S | 1 | O | x | x | E | x | E | x | x | x | x | f | L | (L) |
| | 2 | O | O | O | E | x | E | E | E | x | x | (L) | f | (L) |
| | 3 | x | O | O | E | E | E | x | E | x | x | f | f | (L) |
| | (3) | x | x | x | E | E | E | x | E | x | x | f | f | (L) |
| L | 1 | O | x | x | E | x | E | x | x | E | x | f | (L) | (L) |
| | 2 | O | O | x | E | x | E | E | E | x | x | (L) | f | (L) |
| | (1) | x | x | x | E | x | E | x | x | E | x | f | (L) | (L) |

Figure 3:
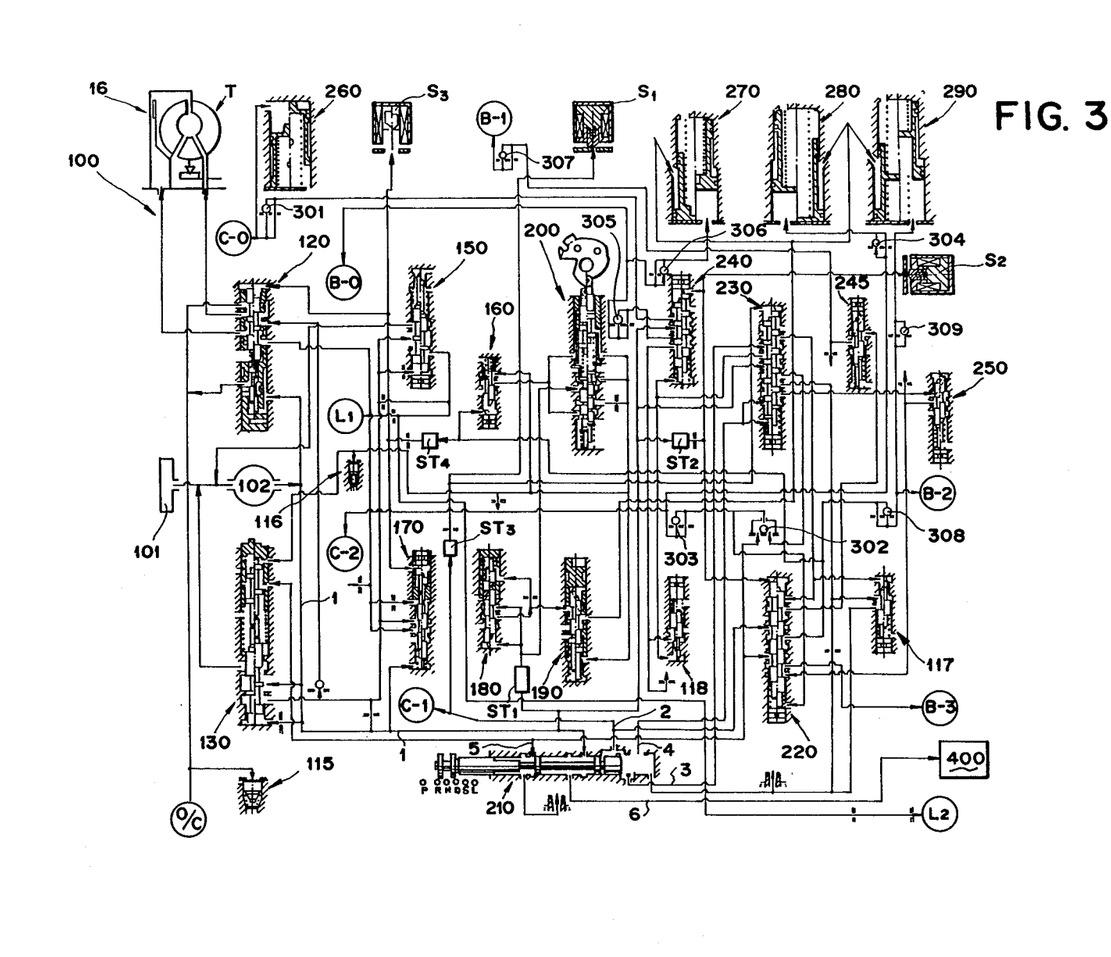
FIG. 3 is a circuit diagram of a hydraulic control system of the 4-speed automatic transmission.

The main hydraulic control system 100 of the 4-wheel drive automatic transmission 10 includes: an oil strainer 101; an oil pump 102 serving as a line pressure source; a cooler by-pass valve 115; a pressure relief valve 116; a release clutch control valve 117; a release brake control valve 118; a lock-up relay valve 120; a pressure regulator valve 130; a second pressure regulator valve 150; a cutback valve 160; a lock-up control valve 170; a first accumulator control valve 180; a second accumulator control valve 190; a throttle valve 200;

a manual valve 200; a 1-2 shift valve 220; a 2-3 shift valve 230; a 3-4 shift valve 240; an intermediate coast modulator valve 245 for adjusting the oil pressure to be supplied to the brake B1; a low coast modulator valve 250 for adjusting thee oil pressure to be supplied to a hydraulic servo B-3; an accumulator 260 for smoothening the engagement of the clutch CO; an accumulator 270 for smoothening the engagement of the brake BO; an accumulator 280 for smoothening the engagement of the clutch C2; an accumulator 290 for smoothening the engagement of the brake B2; checkvalve-equipped regulator valves 301 to 309 for controlling the flow rates of pressurized oil to be supplied to hydraulic servos C-0, C-1 and C-2 of clutches C0, C1 and C2 and hydraulic servos B-0, B-1, B-2 and B-3 of the brakes B0, B1, B2 and B3, respectively; a first solenoid valve S1 operated by the output of an electronic control system (a computer) to control the 2-3 shift valve 230; a second solenoid valve S2 for controlling both of the 1-2 shift valve 220 and 3-4 shift valve 240; a third solenoid valve S3 for controlling both of the lock-up relay valve 120 and lock-up control valve 170; and conduits communicating the respective valves with each other and with the hydraulic cylinders of the clutches and brakes. The reference characters ST1, ST2, ST3 and ST4 indicate oil strainers provided between the oil conduits, L1 and L2 indicate lubricant oil conduits, and O/C indicates an oil cooler.

The operating oil which is drawn into the oil pump 102 from the pressure source through the oil strainer 101 is regulated to a predetermined oil pressure (line pressure) by the pressure regulator valve 130 for supply to a line pressure output conduit (hereinafter referred to simply as "conduit"). The pressure regulator valve is controlled by a pressure (throttle pressure) which is generated by the throttle valve 200 according to a signal of engine torque requirement, to produce a pressure (line pressure) commensurate with the engine torque requirement signal.

Figure 4:
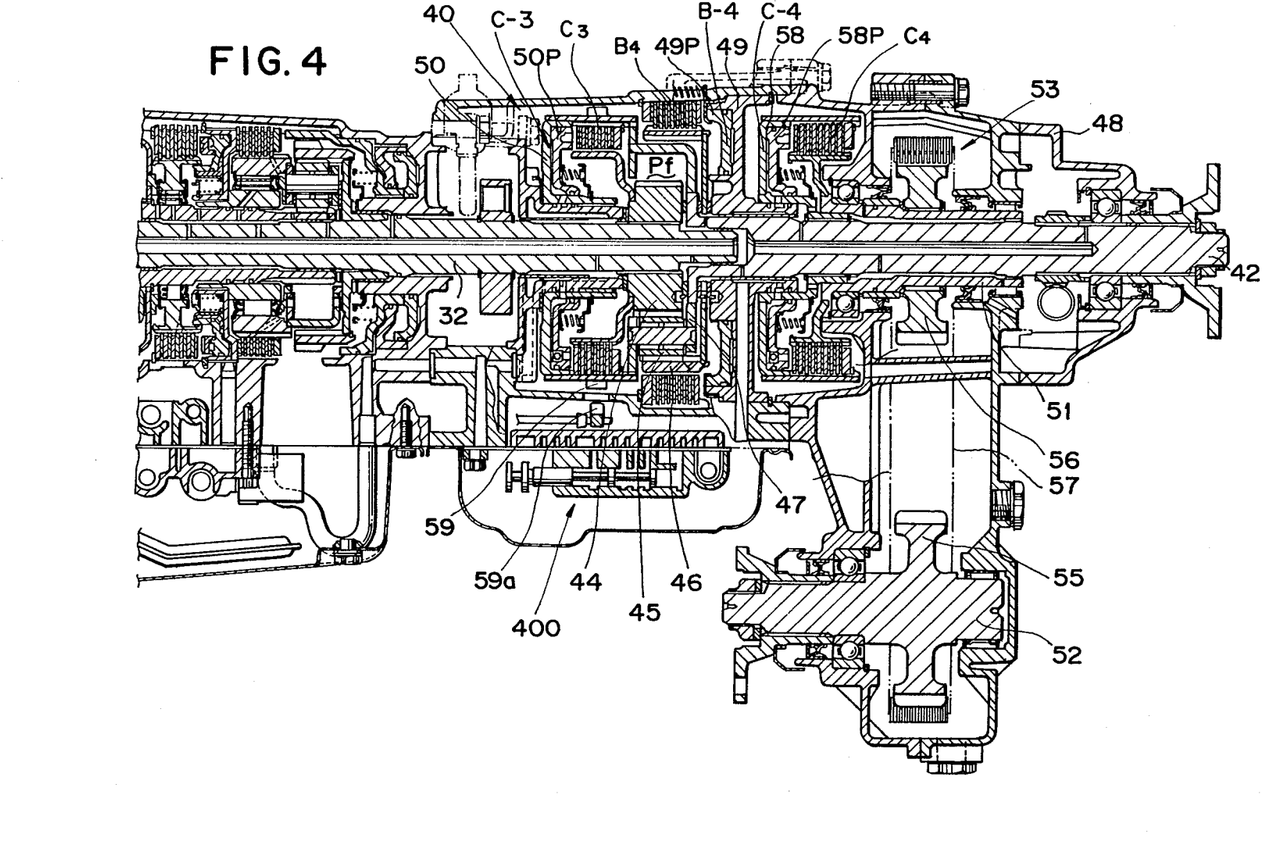
FIG. 4 is a diagrammatic sectional view of an auxiliary transmission of the 4-speed automatic transmission.

The transfer 40 of FIG. 2 includes: a clutch C3 serving as friction element for the high speed range; a brake B4 serving as a friction element for the low speed range; a clutch C4 for swithing the operation between the 2-wheel and 4-wheel drives; an input shaft 32 integral with the output shaft of the planetary gear sets P2 and P3; a first output shaft 42 mounted in series with the input shaft 32; a planetary gear set Pf provided between the input shaft 32 and the first output shaft 42; a 4-wheel drive sleeve 51 rotatably fitted on the first output shaft 42; a second output shaft 52 mounted in parallel relation with the input shaft 32 and extended in the opposite direction relative to the first output shaft 42; and a transfer mechanism 53 provided between the sleeve 51 and the second output shaft 52. The planetary gear set Pf includes a sun gear 44 splined on an end portion of the input shaft 32, planetary pinions 45 meshed with the sun gear 44, a ring gear 46 meshed with the planetary pinions 45, and a carrier 47 rotatably retaining the planetary pinions 45 therein and coupled with the fore end of the first output shaft 42 of the transfer 40. In the particular embodiment shown, the brake B4 comprises a multiple disk friction brake for engaging the ring gear 46 with the transfer case 48 as illustrated in FIG. 4, and operated by a hydraulic servo B-4 for the low speed range (hereinafter referred to simply as "hydraulic servo B-4") which is constituted by a cylinder 49 formed in the transfer case 48 and a piston 49P fitted in the cylinder 49. The clutch C3 is located on the side of the 4-wheel drive automatic transmission to engage and disengage the sun gear 44 and carrier 47 of the planetary gear set Pf, and operated by a hydraulic servo C-3 for the high speed range (hereinafter referred to simply as "hydraulic servo C-3") which comprises a cylinder 50 connected to the carrier 47 and a piston 50P fitted in the cylinder 50. The clutch C4 comprises a multiple disk friction clutch which serves to engage and disengage the first output shaft 42 coupled with the carrier 47 and the sleeve 51 coupled with one sprocket 56 of the transfer mechanism 53 which drives the second output shaft 52, and operated by a hydraulic servo C-4 which comprises a cylinder 58 splined with the first output shaft 42 and a piston 58P fitted in the cylinder 58. The transfer mechanism 53 includes a sprocket 56 splined with the sleeve 51, a sprocket 55 formed on the second output shaft 52, and a chain 57 passed around these sprockets.

The cylinder 50 of the hydraulic servo C-3 is provided with a parking gear 59 on the outer periphery thereof, which is meshed with a locking pawl 59a to fix the first output shaft 42 when the shiftlever of the 4-speed automatic transmission 10 is set in the parking position.

In an ordinary cruising operation, the line pressure which is supplied to the hydraulic control system of the automatic transmission is fed to the hydraulic servo C-3 to engage the clutch C3, while draining the hydraulic servos B-4 and C-4 to release the brake B4 and clutch C4. As a result, the sun gear 44 and carrier 47 of the planetary gear set Pf are coupled with each other, transmitting power from the input shaft 32 to the first output shaft 42 at a reduction rate of 1 to operate the vehicle in 2-wheel drive mode driving only the rear wheels thereof. In this mode, the power of the input shaft 32 is transmitted from the carrier 47 to the first output shaft 42 through the clutch C3, without involving efforts of the sun gear 44, planetary pinions 45 and ring gear 46. Since the tooth faces of these gears are free of load, it affords them a prolonged service life. When there arises a necessity for switching the operation to the 4-wheel drive mode during operation in the 2-wheel drive mode, the shiftlever 401 which is provided at the driver's seat is manually shifted to supply the line pressure gradually to the hydraulic servo C-4 of the transfer control system 400 to engage the clutch C4 smoothly, whereupon the first output shaft 42 is coupled with the sleeve 51 to transmit the power also to the front wheels through the transfer mechanism 53, second output shaft 52 and propeller shaft B (FIG. 1) to establish the lock-up 4-wheel drive mode (high speed 4-wheel drive), transmitting the power from the input shaft 32 to the first and second output shafts 42 and 52 at the reduction rate of 1. If the shiftlever is manually shifted during the 4-wheel drive mode due to a necessity for increasing the output torque, for example, for a hill-climbing operation, the oil pressure to the hydraulic servos is applied to the inhibitor valve 440, which is a change-over valve for switching the mode of operation between the high speed 4-wheel drive and the low speed 4-wheel drive, supplying the line pressure gradually to the hydraulic servo B-4 and draining the hydraulic servo C-3 with appropriate timing thereby to engage the brake B4 gradually and release the clutch C3 smoothly. Consequently, the sun gear 44 and carrier 47 are released, and the ring gear 46 is fixed, and the power of the input shaft 32 is transmitted to the first and second output shafts 42 and 52 after speed reduction through the sun gear 44, planetary pinions 45 and carrier 47 to establish the mode of reduced 4-wheel drive (low speed 4-wheel drive) of a greater torque.

The shiftlever (not shown) of the transfer 40, which is provided at the driver's seat for driving the transfer manual valve 410, has subsidiary shift positions SSP for the ranges of H2 (lock-up 2-wheel drive), H4 (lock-up 4-wheel drive) and L4 (reduced 4-wheel drive). Table 2 below shows these ranges of the subsidiary shift positions SSP and the states of the brake B4 and the clutches C3 and C4 in relation with the modes of operation of the vehicle.

In Table 2, as in Table 1, a circle "○" indicates the energized state of S4 and a cross "x" indicates the de-energized state of S4. The characters "E" and "x" indicate that the corresponding clutch or brake is in an engaged or disengaged state, respectively. The character alpha "α" indicates that, once S4 is energized, the reduced speed mode is maintained even if S4 is de-energized. Similarly, the term beta "β" indicates that, once S4 is energized, the reduced speed mode is maintained even if S4 is de-energized.

TABLE 2

| SSP | S4 | C3 | B4 | C4 | Mode of Operation |
|---|---|---|---|---|---|
| H2 | α | E | x | x | H2 |
| H4 | α | E | x | E | H4 |
|  | ○ | x | E | E | L4 |
| L4 | x | F | x | E | H4 |
|  | β | x | E | E | L4 |

Figure 5:
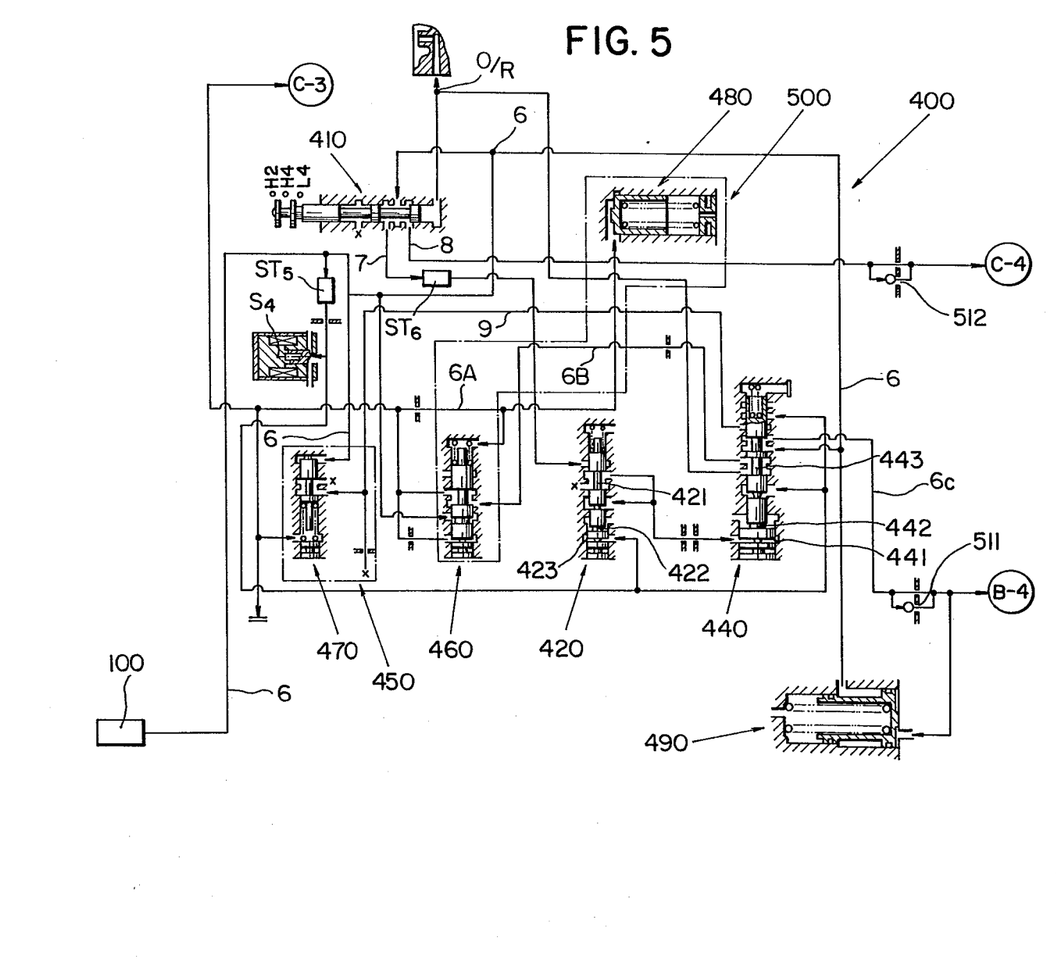
FIG. 5 is a diagram of a hydraulic circuit of the auxiliary transmission of the 4-speed automatic transmission, incorporating an inhibitor valve.

The transfer control system 400, which constitutes an auxiliary hydraulic control system of the 4-wheel drive transfer 40, is supplied with line pressure from conduit 1 of the main hydraulic control system 100 through the manual valve 210. When the manual valve 210 is in the parking position (P), the supply of line pressure to the transfer control system 400 is blocked as seen in FIG. 3, fixing the first output shaft 42 alone irrespective of the position of the shiftlever or shift switch of the auxiliary transmission to lessen the load on the parking mechanism and to guarantee stable parking constantly. As shown in FIG. 5, the transfer control system 400 includes: a transfer manual valve 410 to be operated by a shiftlever at the driver's seat to supply the line pressure from conduit 6 to conduits 7 and 8 and serving as means for selecting a speed range; a relay valve 420; an inhibitor valve 440 for switchingly engaging C3 and B4; an accumulator valve 490 for smoothly engaging the brake B4; a shift timing mechanism 450 provided in a drain conduit of the hydraulic servo B-4 of the brake B4 and arranged to adjust the timing of drainage of the hydraulic servo B-4 at the time of a L4-H4 or L4-H2 shift in relation with the timing of the oil pressure supply to the hydraulic servo C-3 of the clutch C3; a shock buffer mechanism 500 provided in an oil supply conduit 6A to the hydraulic servo C-3 of the clutch C3 for moderating the rise of the line pressure; check-valve-equipped flow control valves 511 and 512 for controlling the flow rates of the line pressure to be supplied to the hydraulic servos B-4 and C-4 of the brake B4 and clutch C4; oil strainers ST5 and ST6; a fourth solenoid valve S4 opened and closed by the output of the electronic control system 600; an oil return conduit O/R to the 4-speed automatic transmission 10; and conduits communicating the respective valves with each other and with the hydraulic cylinders of the clutches and brakes.

Figure 6:
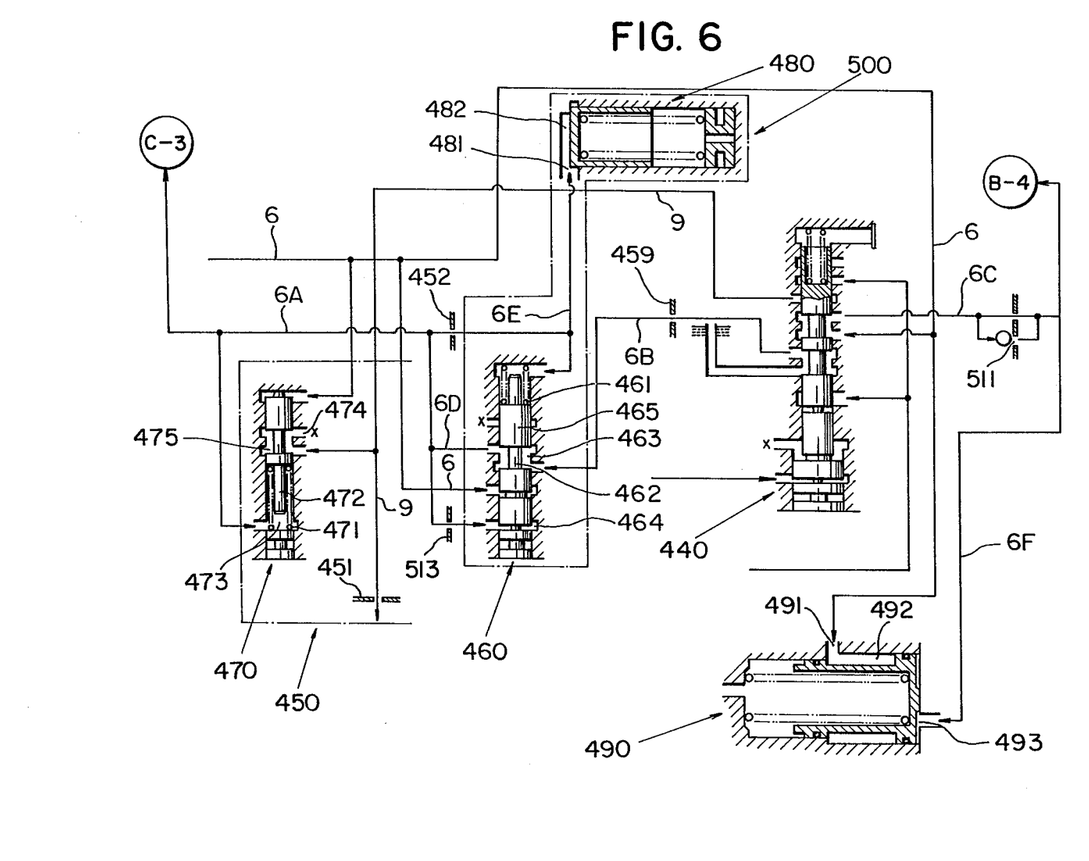
FIG. 6 is a hydraulic circuit diagram showing major components of the hydraulic circuit shown in FIG. 5.

As shown in FIG. 6, the shift timing mechanism 450 comprises a drain orifice 451 which is provided in conduit 9, and a shift timing valve 470.

The shift timing valve 470 is provided with a spool 472 which is biased upward in the drawing by a spring 471. When the transfer 40 is changed into H2 or H4 mode, the line pressure is admitted into the lower oil chamber 473 through conduit 6A, holding the spool 472 in the upper position in the drawing by the action of the spring 471, and the drain port 474 is communicated with the drain conduit 9 at the intermediate oil chamber 475 to accelerate drainage of the hydraulic servo B-4. When the manual valve 410 of the transfer 40 is in L4 position, the line pressure in the lower oil chamber 473 is drained, and the spool 472 is held in the lower position in the drawing by the line pressure in the upper oil chamber 476 which is constantly in communication with conduit 6. The characteristics of the shift timing valve 470 is varied according to the throttle opening by the line pressure which prevails in the upper oil chamber 476 of the shift timing valve 470. Since this control is performed on the basis of the line pressure, there is no necessity for providing in the transfer control system 400 a means for producing a pressure according to a torque requirement signal or for providing a conduit between the main hydraulic control system 100 and the transfer control system 400 to transmit signal pressures therethrough.

The shock buffer mechanism 500 comprises a third accumulator control valve 460 and an accumulator 480 which guarantees smooth engagement of the clutch C3.

The third accumulator control valve 460 is provided with a spool 462 which is biased upward in the drawing by a spring 461. When the transfer 40 is shifted to H2 or H4 position, the spool 462 is displaced under the influence of the downwardly acting load of the spring 491 and the feedback of the output oil pressure which is applied to its lower oil chamber 464 through conduit 6B, intermediate oil chamber 463, conduit 6D and orifice 513, thereby regulating the line pressure from conduit 6B. The regulated output pressure which appears in conduit 6D is supplied to the accumulator chamber 482 from port 481 of the accumulator 480 to control pressure accumulation by the accumulator 480, and the output pressure from the accumulator chamber 482 is fed back to an upper land 485 through conduit 6E. This third accumulator control valve 460 can set the operating time of the accumulator 480 with a relatively large freedom since the diameter of the orifice 452 in conduit 6A to the accumulator 480 can be provided separately from the orifice 459 to the hydraulic servo C-3.

When the mode of operation is changed to L4 from H2 to H4, the oil pressure which is supplied to B-4 from conduit 6C is applied to the accumulator chamber 493 of the accumulator 490 to engage the brake B4 smoothly, and the line pressure which is supplied from conduit 6 is supplied to the back pressure chamber through a back pressure port 491 to control the back pressure of the accumulator 490, thereby controlling the rise of the B4 engaging oil pressure according to the throttle opening.

Figure 7:
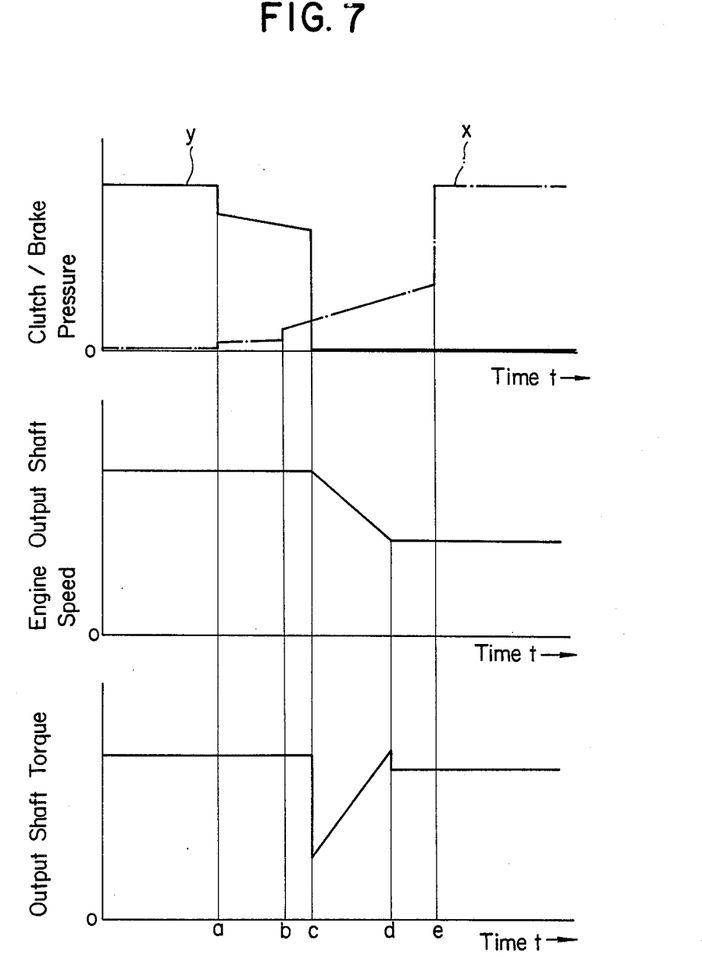
FIG. 7 is a characteristics diagram of servo pressure, engine output shaft speed and output shaft torque at the time of L-H shift of the automatic transmission employing the hydraulic control system of the invention.

For a shift to the high speed gear position from the low speed gear position L4, the shiftlever of the transfer 40 is changed from L4 to H4 position by the driver (at point to) when the oil pressure (Y) of the hydraulic servo B-4 of the brake B4 is at the same level as the line pressure, namely, when operating in the low speed range L4 as shown in FIG. 7, whereupon conduits 6 and 7 are communicated with each other and the spool 421 and plunger 422 of the relay valve 420 are held in the upper positions in the drawing by the solenoid pressure which is admitted in the lower oil chamber 423 since the fourth solenoid valve S4 is in de-energized state if in a shift permissible range. Consequently, conduits 7 and 7A are communicated with each other, and the line pressure is admitted into the lower oil chamber 441 of the inhibitor valve 440, holding the spool 443 in the upper position in the drawing (point ta). At this time, conduits 6C and 9 are communicated with each other through the inhibitor valve 440 to drain the hydraulic servo B-4 gradually through the drain orifice 513, and conduits 6 and 6B are communicated with each other to supply the line pressure to the intermediate oil chamber 463 of the third accumulator control valve 460, sending the output oil pressure of the third accumulator control valve 460 to the accumulator 480 to start its operation (point tb). In this instance, the line pressure is supplied to the lower oil chamber 473 of the shift timing valve 470 from conduit 6A, the spool 472 is held in the upper position in the drawing, communicating the drain conduit 9 with the drain port 474 through the intermediate oil chamber 475 to accelerate the oil drainage for release of the brake B4 (point tc). Between points ta and td, the oil pressures of the brake B4 and accumulator 490 are drained through the drain orifice 513, so that a high pressure can be maintained for a longer time period by the reaction elements (spring, back pressure etc.) of the accumulator to secure a sufficient torque capacity for supressing fluctuations in the rotational speed of the engine and the output shaft torque. In the neutral state during the time period between the points tc and ta, the rotational speed of the engine drops, and the output shaft torque drops at point tc and then increases up to point td. Since the release of the brake B4 is timed with the engagement of the clutch C3 (point td), there occurs no abrupt increase or drop in the rotational speed of the engine, and the shift feeling is improved by suppression of the variation in the output shaft torque. The operation of the accumulator 480 is terminated at point te, and the oil pressure x of the hydraulic servo C-3 comes to the level of the line pressure.

Figure 9:
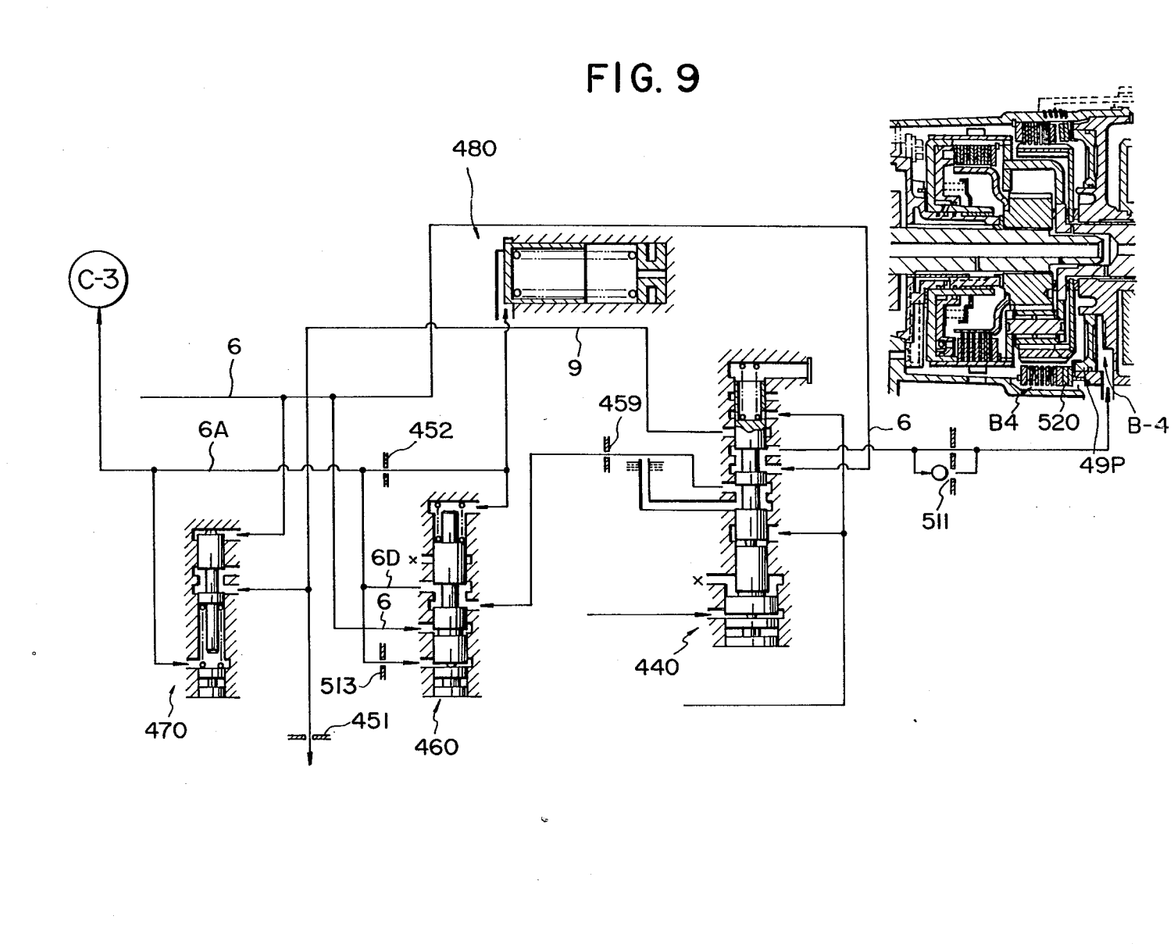
FIG. 9 is a hydraulic circuit diagram showing another embodiment of the hydraulic control system of the invention.

FIG. 9 illustrates another embodiment of the hydraulic control system for automatic transmission, according to the invention, which employs a cushion plate 520 between the brake B4 and piston 49P instead of the accumulator which serves to engage the brake B4 smoothly. This cushion plate 520 has the same effects as the accumulator 480.

Table 3 below shows the communication of conduits 2 to 6 with conduit 1 in the respective shift positions of the shiftlever of the main transmission.

The manual valve 510 is linked to the shiftlever at the driver's seat, and manually shiftable to the positions of P (parking), R (reverse), N (neutral), D (drive), S (second) and L (low) according to the range selected by the shiftlever. In Table 3 which shows the communication of conduits 2 to 6 with conduit 1 in the respective shift ranges of the shiftlever, a circle "O" indicates a communicated state with supply of the line pressure, and a cross "x" indicates a drained state.

TABLE 3

|  | P | R | N | D | S | L |
|---|---|---|---|---|---|---|
| Conduit 2 | x | x | x | O | O | O |
| Conduit 3 | x | x | x | x | O | O |
| Conduit 4 | x | x | x | x | x | O |
| Conduit 5 | x | O | x | x | x | x |
| Conduit 6 | x | O | O | O | O | O |

Table 4 below shows the communication of conduits 7 and 8 with conduit 6 in the respective shift positions of the auxiliary transmission.

TABLE 4

|  | H2 | H4 | L4 |
|---|---|---|---|
| Conduit 7 | O | O | x |
| Conduit 8 | x | O | O |

Similarly to Table 3, the marks " " and "x" in table 4 indicate a communicated state with supply of the line pressure and a drained state, respectively.

Figure 8:
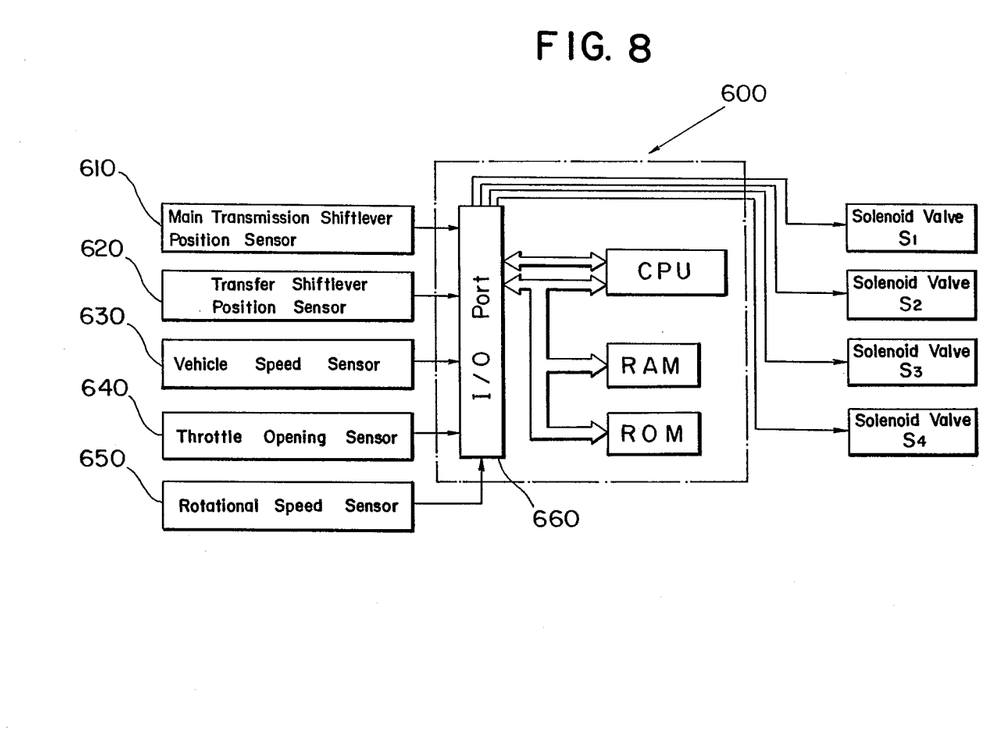
FIG. 8 is a block diagram of an electronic control system employed by the 4-wheel drive automatic transmission.

The electronic control system 600 which controls the energization and de-energization of the solenoid valves S1 to S4 of the hydraulic control system 100 and the transfer control system 400 includes as shown in FIG. 8: a main transmission shiftlever position sensor 610 which detects the selected range of the main transmission; a transfer shiftlever position sensor 620 which detects the selected range of the auxiliary transmission; a vehicle speed sensor 630 which converts signals detected from the rotational speed of the output shaft of the auxiliary transmission into vehicle speed signals; a throttle opening sensor 640 which detects the amount of accelerator pedal depression; a rotational speed sensor 650 adapted to detect the rotational speed of a speed detecting means which detects the rotational speed of the output shaft of the 4-speed automatic transmission or the input shaft of the transfer 40; an I/O port 660 serving as an input port for these sensors and as an output port for the selenoid valves S1 to S4; a central processing unit CPU; a random access memory RAM; and read-only memory ROM storing data of shift patterns for the shift and lock-up points.

What is claimed is:

1. A hydraulic control system for an automatic transmission having a main transmission and an auxiliary transmission connected to said main transmission, said control system comprising:
   a hydraulic fluid pressure source;
   a regulator valve for regulating an output fluid pressure from said source;
   a first hydraulic servo for setting said auxiliary transmission in a high speed operating range responsive to said output fluid pressure of said pressure regulator valve;
   a second hydraulic servo for setting said auxiliary transmission in a low speed operating range responsive to said output fluid pressure of said pressure regulator valve;
   a valve means for selectively supplying said output fluid pressure to one of said hydraulic servos and for draining said output fluid pressure from the other of said hydraulic servos through a first conduit communicating with said first hydraulic servo and a second conduit communicating with said second hydraulic servo;
   a check valve-equipped flow control valve in said second conduit for controlling the flow rate of said output fluid pressure supplied to said second hydraulic servo;

a drain conduit connected to said valve means for draining said second hydraulic servo, said drain conduit having an outlet end portion; and, a shift timing mechanism having a shift timing valve in said drain conduit and a drain orifice located in said outlet end portion of said drain conduit, said shift timing valve comprising a valve body movable between a first position for communicating between said drain conduit and a drain port and a second position blocking communication between said drain conduit and said drain port, said valve body being biased toward said first position by said output fluid pressure supplied to said first hydraulic servo, the shift timing valve being thereby adapted to accelerate drainage of said output pressure from said second hydraulic servo responsive to increases in supply fluid pressure to said first hydraulic servo, whereby shift shock is effectively suppressed.

2. The hydraulic control system of claim 1, wherein: said pressure regulator valve is adapted to produce said output fluid pressure responsive to an engine torque demanding signal; and, said valve body of said shift timing valve is biased toward said second position by said output fluid pressure.

3. The hydraulic control system of claim 1, wherein said hydraulic fluid pressure source forms part of said main transmission.

4. The hydraulic control system of claim 3, further comprising a main hydraulic control system for said main transmission and an auxiliary hydraulic control system for said auxiliary transmission, said pressure regulator valve forming part of said main hydraulic control system and said shift timing valve forming part of said auxiliary hydraulic control system.

5. The hydraulic control system of claim 1, further comprising a main hydraulic control system for said main transmission and an auxiliary hydraulic control system for said auxiliary transmission, said pressure regulator valve forming part of said main hydraulic control system and said shift timing valve forming part of said auxiliary hydraulic control system.

* * * * *